United States Patent [19]

Suchevich et al.

[11] Patent Number: 4,778,155
[45] Date of Patent: Oct. 18, 1988

[54] PLASMA ARC HOLE CUTTER

[75] Inventors: Robert M. Suchevich, Lower Burrell; Lawrence A. Bollinger, Gibsonia, both of Pa.

[73] Assignee: Allegheny Ludlum Corporation, Pittsburgh, Pa.

[21] Appl. No.: 76,829

[22] Filed: Jul. 23, 1987

[51] Int. Cl.[4] ............................................. B23K 7/10
[52] U.S. Cl. .................................. 266/70; 219/121.39; 219/121.48; 219/121.7
[58] Field of Search ............................. 266/70, 58, 48; 219/121 PC, 121 PM, 121 LK

[56] References Cited

U.S. PATENT DOCUMENTS

| | | | |
|---|---|---|---|
| 2,801,098 | 7/1957 | Plumb | 266/23 |
| 4,063,059 | 12/1977 | Brolund et al. | 219/68 |
| 4,201,905 | 5/1980 | Clark et al. | 219/121 |
| 4,554,431 | 11/1985 | Koeller | 219/121 PC |

OTHER PUBLICATIONS

Weymueller, Carl R.; Tough Nickel Alloys Yield to Plasma Cutting; *Welding Design & Fabrication;* pp. 37-39; Dec. 1984.

*Primary Examiner*—Wayland Stallard
*Attorney, Agent, or Firm*—Patrick J. Viccaro

[57] ABSTRACT

A plasma arc hole cutting device is disclosed for removing selected portions of metal workpieces, such as stainless steel, for testing or marking purposes. A plasma torch is connected at one end to a rotatable cam element and spaced a distance from the center of the cam element such that rotation of the cam element by a drive motor causes the plasma torch to rotate in an orbit about a longitudinal axis defined by the cam element. Suitably supported, the plasma torch burns a circular hole through the workpiece, thereby creating a slug which may be removed and analyzed, leaving a circular hole in the workpiece.

6 Claims, 2 Drawing Sheets

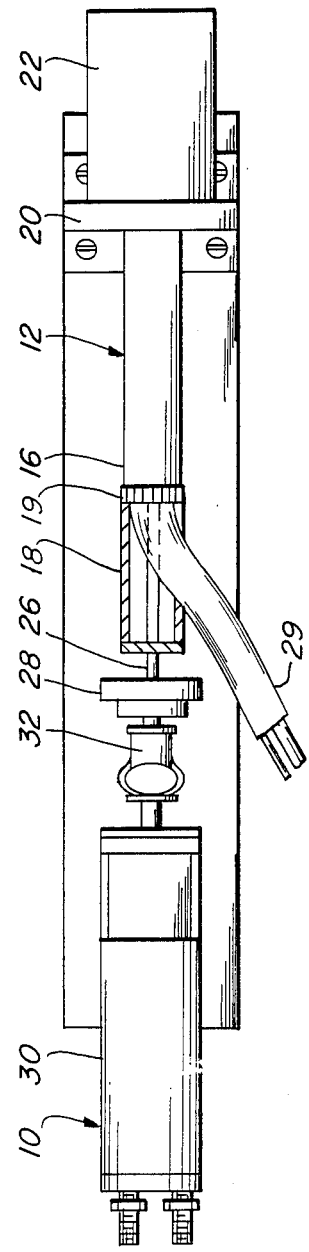
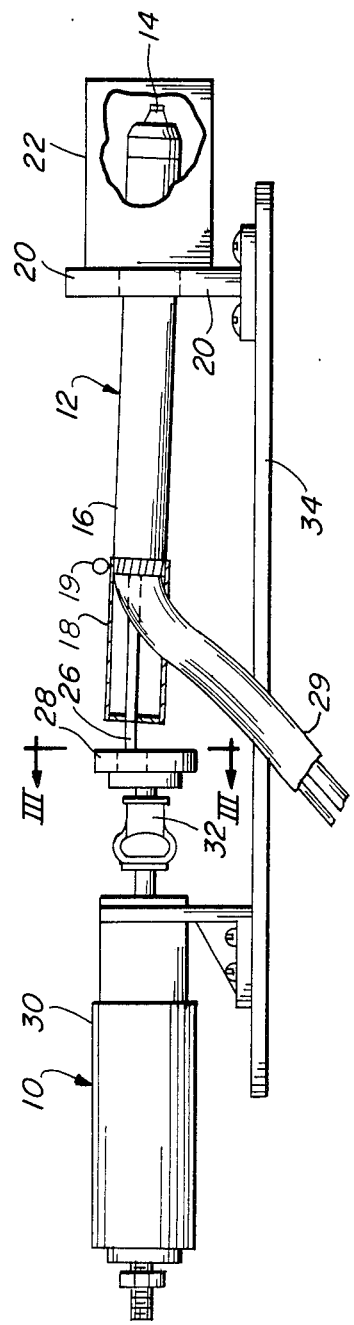

PLASMA ARC HOLE CUTTER

BACKGROUND OF THE INVENTION

1. Field of the Invention

The present invention relates generally to cutting devices, and, more particularly, to a cutting torch aiming assembly for cutting holes of a predetermined size in metallic workpieces.

2. Description of the Prior Art

While not so limited, the present invention is particularly useful to ensure that metal products such as steel strip meet acceptable standards of quality and uniformity by periodic inspection of the metal during production of the product. In the past, inspection was made by the taking one or more small samples from the metal at various locations along the length thereof. Once removed from the metal strip, the samples may thereafter be analyzed to ensure that the quality and uniformity of the metal meets the required standards along the entire length of the workpiece.

In the existing art, when such a method of inspection is utilized, samples are most frequently taken from the metal strip through use of a punch and die setup. The punch and die allows holes to be punched through the metal strip thereby producing sample slugs which may be removed and analyzed. However, after repeated use of the punch and die, the punch and die becomes worn due to the hardness of the metal strip which may, for example, be a stainless steel alloy. After even a short period of operation, the punch and die are worn to such an extent that the strip of metal hangs onto the punch causing unnecessary delay time to the operation. Also, it is necessary to frequently replace the punch and die. Such replacement causes delay and downtime.

The punch and die are also frequently utilized to mark metal workpieces by cutting identification holes therethrough. Similarly, after repeated use of the punch and die setup, the punch and die becomes worn and must be replaced, once again causing delay and downtime.

Various devices and apparatus have been developed to cut holes in workpieces for many varying purposes. For example, U.S. Pat. No. 2,801,098 discloses a portable apparatus for burning circular holes in metal plate. The apparatus utilizes a conventional torch disposed in a support structure having a rotatably driven head member. Rotation of the head member about a vertical axis causes the torch to similarly rotate, thereby allowing the torch to burn a circular hole in the metal plate. Because the apparatus is portable, the torch may be transported and used at a job site making the apparatus of particular value to fabricators.

A punch press disclosed in U.S. Pat. No. 4,063,059 includes a plasma arc torch in addition to the conventional punch and die setup of a punch press. The punch and die setup is utilized to punch circular holes into a workpiece, while the plasma arc torch is utilized for cutting large and irregularly shaped holes into the workpiece. In a similar manner, a punch press disclosed in U.S. Pat. No. 4,201,905 includes a laser cutting head in addition to a conventional punch and die setup, such laser being utilized to mark a workpiece as well as to cut holes into the workpiece. Because of the small diameter of the laser beam, the laser may be utilized to bore small diameter openings into the workpiece. However, lasers are highly sensitive devices, and are frequently unusable in the high shock, vibration, and dust environment of a mill. Additionally, lasers of energies allowing the laser beam to cut holes into metal plate, such as stainless steel metal plate, are high cost devices.

Existing cutting devices utilizing plasma arc torches function to create either irregularly shaped, or large, circular holes in a workpiece. No prior art device can adequately control the aiming of a plasma arc torch to allow a hole of a small diameter to be created. What is needed, therefore, is an assembly to aim a plasma arc torch cutting device to cut holes of predetermined small diameters into a workpiece.

It is therefore the object of the present invention to provide a plasma arc torch apparatus allowing holes of small diameters to be cut into metallic workpieces.

SUMMARY OF THE INVENTION

In accordance with the present invention, there is provided a cutting device to cut holes, including those of small diameters, in a workpiece. The cutting device includes a torch means which produces a cutting flame at a tip portion thereof to cut through the workpiece. Such torch means may, for example, comprise a plasma arc torch. A pivot carries the body portion of the torch for orbited movement of the top portion of the torch. A torch holder means is provided to control the orbital position of the torch means. A drive means connects with the torch holder means for pivoting the torch means, in an orbit about a rotational axis of a rotatory device member, thereby causing rotation of the tip portion of the torch in an orbit about the longitudinal axis. The drive means may, for example, be comprised of a rotatable cam element having a cam follower protruding therefrom, with the cam follower being positioned a distance from the longitudinal axis to allow the cam follower to rotate in an orbit about the longitudinal axis. The torch holder means may be comprised of a cup member attached to the cam follower for supporting the torch thereby allowing the torch to also rotate in the orbit defined by the eccentricity of the cam thus allowing the torch leads not to become entangled during rotation. The pivot means contacting with the torch means along the length thereof provides pivotal support to the torch means.

In one embodiment of the present invention, the cutting device further includes an alignment means positioned beneath the torch means for maintaining the torch means, the drive means, the pivoting means, and the torch holder means, in an aligned relation. In a still further embodiment, a spark shield is attached to the pivot means for encircling the second end of the torch means to prevent evolution of sparks during operation of the cutting device.

BRIEF DESCRIPTION OF THE DRAWINGS

The features and advantages of the present invention will be more fully understood when the following description is read in light of the following drawings in which:

FIG. 1 is a side view, in elevation, of the cutting device of the present invention;

FIG. 2 is an overhead view of the cutting device of FIG. 1;

DESCRIPTION OF THE PREFERRED EMBODIMENT

Figure 4:
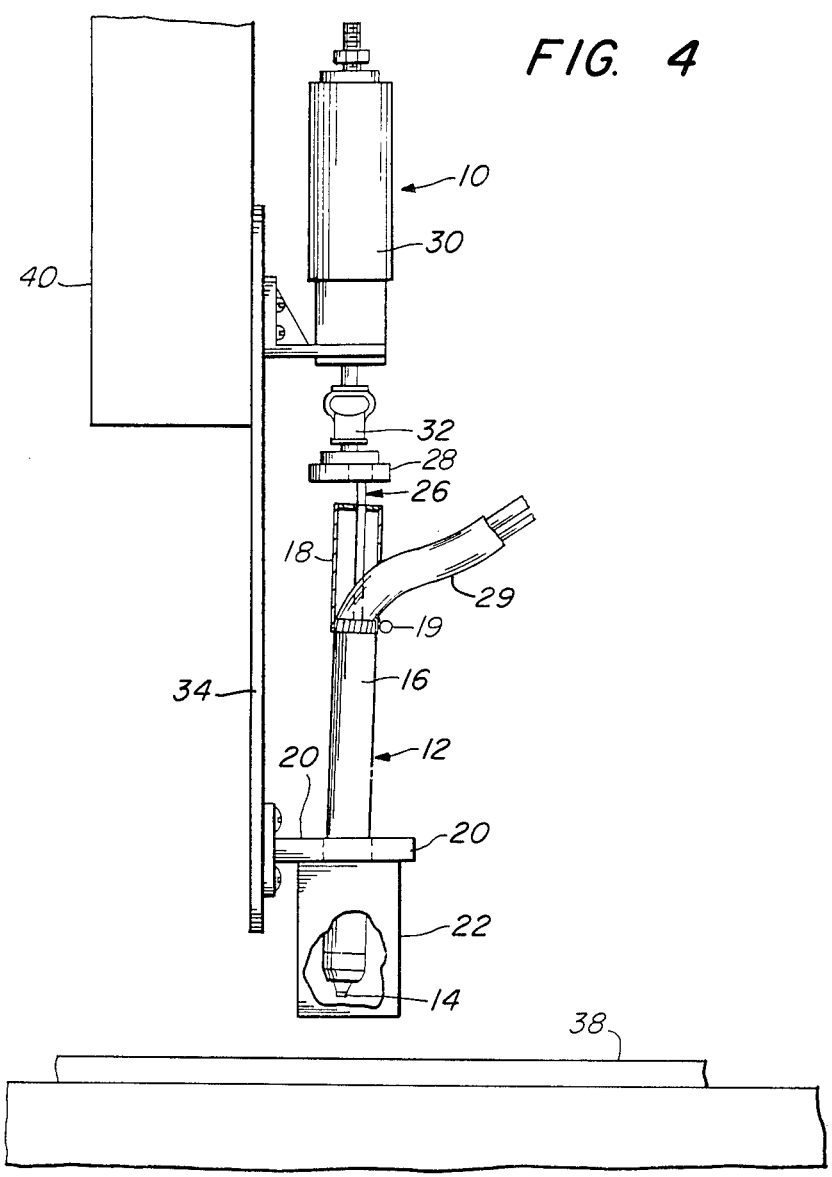
FIG. 4 is a schematic illustration of the cutting device of the present invention in the retracted position above a workpiece before lowering the cutting device to burn a hol of a predetermined diameter into the workpiece.

Referring first to the side elevational view of FIG. 1 and the overhead view of FIG. 2, there is illustrated the cutting device 10 of the present invention which allows holes of a desired diameter to be created in a metal workpiece. Cutting device 10 includes plasma arc torch 12. Plasma arc torches such as torch 12 are commercially available as, for example, from Thermal Dynamics Corp. of West Lebanon, N.H. Tip 14 is positioned at a one end of the torch 12. Tip 14 contains a small orifice through which a column of gas is forced during operation of the torch. Torch 12 produces a high temperature plasma arc when an electric arc is also caused to span the gap of the orifice. The electric arc ionizes the gas, and the ionized column of gas is discharged from the orifice of tip 14 at a high velocity and a high temperature (up to 30,000 degrees fahrenheit). When the pilot arc transfers to the metal workpiece, the ionized column of gas causes instantaneous melting of that portion of the workpiece.

Torch 12 is supported as to extend in a generally longitudinal direction by a cup-shaped torch holder 18 which may be fastened to torch 12 by any conventional means, such as clamp member 19. Torch 12 is further pivotally supported along the length thereof by pivot bracket 20. Extending outwardly from pivot bracket 20 is spark shield 22. Spark shield 22 surrounds an end portion of torch 12 to prevent evolution of molten metal and sparks away from the burning area when burning operations commence.

Torch holder 18 is attached to and supported by cam follower 26. Cam follower 26 is fastened to, and protrudes outwardly from cam element 28. Cam follower 26 is fastened to cam element 28 at a point spaced a distance from the central, longitudinal axis of cam element 28. Rotation of the cam element 28 thereby causes cam follower 26 to rotate in an orbit about the longitudinal rotational axis defined by cam element 28. Cam element 28 is rotatably coupled to a drive means 30, such as a variable speed motor, through coupling 32. Pivot bracket 20 and drive means 30 are fixed in an aligned relationship by attachment to mounting base 34.

Figure 3:
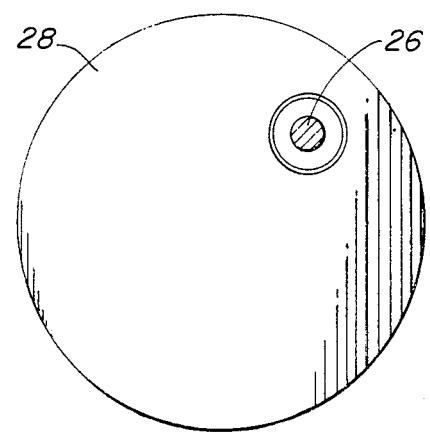
FIG. 3 is a cross-sectional view taken along lines III—III of FIG. 1.

FIG. 3 illustrates the position of cam follower 26 relative to a longitudinal axis defined by the central axis extending through cam element 28. Rotation of cam element 28 about the longitudinal axis thereof causes cam follower 26 to rotate in an orbit about the longitudinal axis. When torch holder 18 and a torch 12 attached thereto is connected to cam follower 26, torch 12 (and tip 14 located at the end thereof) is caused to rotate in unison with rotation of cam element 28, this allowing torch leads 29 not to become entangled during rotation.

Referring now to the illustration of FIG. 4, there is illustrated the cutting device 10 of the present invention positioned above a workpiece 38 in order to allow cutting therethrough of holes of a desired diameter. By preselecting the distance of cam follower 26 from the central longitudinal axis of cam element 28, the diameter of the hole burned through workpiece 38 during operation of the cutting device 10 may be predetermined. For testing or identification purposes, the slugs created when burning a hole through workpiece 38 need to be no more than ½ inch in diameter. While the cutting device of the present invention has been developed to cut small-diameter holes through metal workpieces, larger-diameter holes may similarly be created by merely increasing the distance of cam follower 26 from the longitudinal axis defined by the longitudinal axis of cam element 28 or by raising the pivot bracket 20 further up the mounting base 34 towards the drive motor 30.

An external support structure, pictured generally as 40, positions cutting device 10 downward in that the spark shield 22 contacts work piece 38 and so that now tip 14 of torch 12 can be positioned proximate to workpiece 38 such that when torch 12 is energized, the flame created thereby is directed towards the surface of workpiece 38. When a sample is desired to be taken from workpiece 38, torch 12 is energized and drive means 30 is powered to cause rotation of cam element 28. Rotation of cam element 28 in turn cuuses rotation of cam follower 26, and torch holder 18 attached thereto, to follow. Torch 12 also, in turn, is caused to rotate. Tip 14 of torch 12 is caused to rotate in a circular path, thereby creating a circular burn area in workpiece 38. Once the entire circular area has been burned through, the newly created slug may be removed and tested in order to ensure that the quality of the workpiece 38 is adequate.

While the present invention has been described in connection with the preferred embodiment of FIGS. 1-4, it is understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

We claim as our invention:

1. A cutting device to cut a hole through a workpiece, said cutting device comprising:
   torch means having an elongated body extending to a flame tip portion for cutting said workpiece;
   pivot means carrying the elongated body of said torch means for orbital movement of the flame tip portion;
   torch holder means spaced from said pivot means and engaged with the elongated body of said torch means for controlling the orbital position of said tip portion of the torch means; and
   drive means including a rotary drive member connected to an orbital control shaft at a place spaced from the rotational axis of the rotary drive member, said orbital control shaft being connected to said torch holder means for moving the tip portion of said torch means in a circular orbit.

2. The cutting device of claim 1, wherein said torch means includes a plasma torch.

3. The cutting device of claim 1 further including means positioned beneath said torch means for maintaining said torch means, said drive means, said pivot means, and said torch holder means in an operative relation.

4. The cutting device of claim 1 further including a spark shield for encircling said tip portion of the torch means.

5. The device of claim 1 wherein said rotating means includes a rotatable cam element having a cam follower protruding therefrom, said cam follower being positioned a distance from said longitudinal axis to allow said cam follower to rotate in an orbit about the longitudinal axis.

6. The device of claim 5 wherein said torch holder means includes a cup member attached to said cam follower for supporting a first end of the torch means which is remote to said tip portion.

* * * * *